No. 688,060. Patented Dec. 3, 1901.
E. D. BUSSERT.
TOBACCO PIPE.
(Application filed Apr. 24, 1901.)
(No Model.)
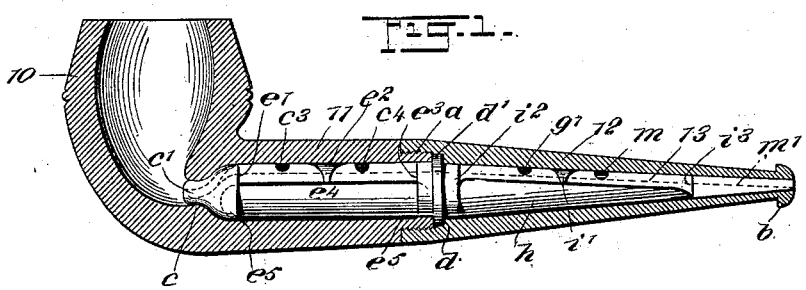
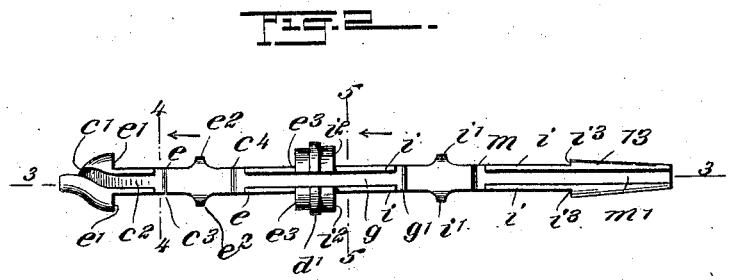
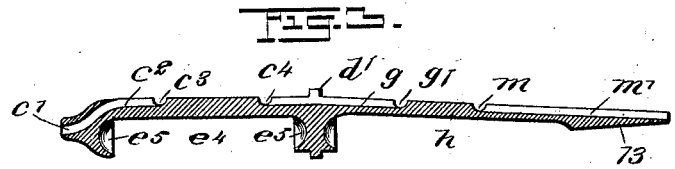
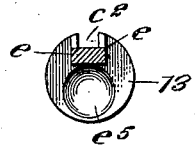 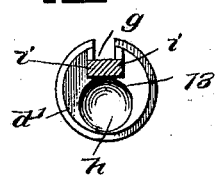
WITNESSES:
INVENTOR
Earl D. Bussert
BY
ATTORNEYS

ABSTRACT# UNITED STATES PATENT OFFICE.

EARL DELBERT BUSSERT, OF LIMA, OHIO.

TOBACCO-PIPE.

SPECIFICATION forming part of Letters Patent No. 688,060, dated December 3, 1901.

Application filed April 24, 1901. Serial No. 57,263. (No model.)

*To all whom it may concern:*

Be it known that I, EARL DELBERT BUSSERT, a citizen of the United States, and a resident of Lima, in the county of Allen and State of Ohio, have invented a new and Improved Tobacco-Pipe, of which the following is a full, clear, and exact description.

This invention has for its object to provide novel features of construction for a tobacco-pipe which render the pipe very convenient for cleansing and that prevent the passage of nicotin from the bowl of the pipe along the stem to the mouth of the smoker, and, furthermore, to arrest the liquid accumulation and prevent it from escaping at the tip end of the pipe-stem into the mouth while the pipe is in service, a further object being to reduce the number of parts of the pipe to a minimum and adapt them for quick separation, exposing all surfaces thereof for a complete cleansing of the same.

The invention consists in the novel construction and combination of parts, as is hereinafter described, and indicated in the claims.

Reference is to be had to the accompanying drawings, forming a part of this specification, in which similar characters of reference indicate corresponding parts in all the views.

Figure 1 is a sectional side view of a pipe having the features of the invention. Fig. 2 is a detached plan view of a detail that embodies important features of the improvement. Fig. 3 is a longitudinal sectional view on the line 3 3 in Fig. 2. Fig. 4 is a transverse sectional view substantially on the line 4 4 in Fig. 2, and Fig. 5 is a like view substantially on the line 5 5 in Fig. 2.

In carrying into effect the features of invention, 10 represents the bowl of the pipe, which may be given the conventional form shown or have any other shape that may be preferred. The pipe-stem consists in part of a cylindrical barrel 11, that may with advantage be formed integral with the bowl 10. Any suitable length and diameter may be given to the barrel portion 11 of the stem, and upon the free end thereof a portion is diametrically reduced and exteriorly threaded to form a nipple, as shown at $a$ in Fig. 1.

A tapered hollow extension 12 is provided to complete the stem of the pipe, this portion of the stem being counterbored and interiorly threaded in said counterbore at the largest end, wherein the threaded end of the barrel 11 is screwed when the parts 11 and 12 are connected. The smaller end of the tapered stem portion 12 is adapted to serve as a mouthpiece by forming a peripheral bead $b$ on its extremity, as shown in Fig. 1.

A draft-passage $c$ is formed at the bottom of the bowl 10 and extends into the cylindric bore of the barrel portion 11 of the stem, and, as shown in Fig. 1, said bore adjacent to the bowl-cavity is gradually contracted, so as to give it funnel shape.

A shoulder $d$ is formed in the interior of the bore in the extension-piece 12 of the stem at the end of the threaded counterbore, the function of which shoulder will be hereinafter explained.

A core 13, which embodies essential features of the invention, is provided as a complementary member of the pipe. The core 13, broadly considered, is shaped to essentially conform to the dimensions of the cylindro-coniform bore of the pipe-stem, this being true before certain portions of the core are removed, as will presently appear. At that part of the core which is closely fitted into the funnel-shaped passage $c$ a spiral channel $c'$ is formed therein, which trends from the bottom surface of the extremity of the core to the top surface of the same, and this spiral groove merges into a straight groove $c^2$, as best shown in Figs. 2 and 3, the forward end of the straight groove $c^2$ terminating in the transverse groove $c^3$. A second transverse groove $c^4$ is formed in the top wall of the core 13, and said groove is suitably spaced from the groove $c^3$, the intervening material affording a baffle-wall which has contact with the bore of the stem 11.

An annular collar $d'$ is formed at such a point on the core 13 as will adapt it to occupy the space at the end of the counterbore in the extension 12, which terminates in the shoulder $d$, and it will be seen in Fig. 1 that the collar $d'$ is pressed against said shoulder when the nipple $a$ is fully screwed into the threaded counterbore against the collar $d'$, and thus prevents the core from turning around in the stem.

The cylindric portion of the core 13 is reduced on opposite sides, as at $e\ e$, which reductions form parallel sides which are nearly but not completely continuous between their ends. (See Fig. 4.) Said sides commence at a shoulder $e'$ near the coniform end portion, having the spiral passage $c'$ therein, and end at the opposite shoulders $e^3$, near the collar $d'$; but preferably two lateral ribs $e^2$ are allowed to remain that form two barriers midway between the shoulders $e'$ and $e^3$, as clearly shown in Fig. 2.

In the upper side of the laterally-reduced cylindric portion of the core 13 a channel $g$ is formed that at one end intersects the transverse groove $c^4$ and extends through the collar $d'$ into the coniform portion of the core 13, merging at the other end into a transverse groove $g'$. The body of the core 13 is cut away on its lower side between the shoulders $e'$ and $e^3$, leaving a bridge portion between the coniform rear end of the core and the collar $d'$, this reduction of the lower part of the core affording an elongated chamber $e^4$ when the core is located in the pipe-stem, and said chamber may be increased in length by cupping the end walls thereof, as clearly shown at $e^5$ in Fig. 3.

An elongated chamber $h$ is formed in the lower side of the coniform portion of the core-piece 13 and extends from a point near the collar $d'$ to another point near the tip end of the core. The sides of the coniform portion of the core are cut away, as shown at $i$ in Fig. 2, leaving two intermediate baffle-walls $i'$ intermediate of the shoulders $i^2$ $i^3$, that are respectively the rear and front terminations of the reduced portions or sides.

Forwardly of the baffle-walls $i'$ and near thereto a transverse groove $m$ is formed in the top surface of the core 13, and longitudinally therein a channel $m'$ is formed, which extends from the transverse groove $m$ to and through the tapered extremity of the core, as clearly represented in Figs. 2 and 3.

It will be seen that the improved pipe consists of but three pieces and that the interior surface of the hollow stem, comprising the cylindrical part 11 and tapered portion 12, is mainly smooth, so that the stem and pipe-bowl may be readily cleansed when the two portions of the stem are separated.

The provision of the spiral smoke passage or channel $c'$, longitudinal groove $c^2$, and the transverse grooves $c^3$ and $c^4$ leaves baffle-walls, which cause the smoke in its passage from the bowl 10 to the tip end of the stem to pass down into the elongated chamber $e^4$, where liquid impurities are deposited.

From the chamber $e^4$ the smoke rises and enters the channel $g$, and if there is any moisture therein it will pass down into the chamber $h$ and thence rise into the longitudinal passage $m'$, so that the smoke in its devious passage from the bowl 10 to the mouth of the smoker is cooled and purified.

The provision of the two liquid-holding chambers $e^4$ and $h$, coacting with the transverse grooves $c^3$, $c^4$, $g'$, and $m$, the longitudinal grooves $c^2$ $g'$ $m'$, and the spiral passage $c'$, serve to prevent any deleterious liquid, such as nicotin, from passing into the mouth of the smoker, and it will be obvious that the ready removal of the core 13 from the other parts of the pipe, that may be quickly effected by separating the two portions of the pipe-stem, will enable the entire surface of the core and interior of the stem to be perfectly cleansed and any impurities thereon to be removed, which will restore the pipe to pure condition for use.

The extreme simplicity of the device renders its production inexpensive, so that a superior tobacco-smoking pipe is afforded at a low cost.

The bowl and fixed portion of the stem may with advantage be formed of hard wood; but it is preferred to employ glass, china, or non-oxidizing metal in the formation of the core.

Having thus described my invention, I claim as new and desire to secure by Letters Patent—

1. A pipe, comprising a bowl having a conical seat adjacent to the draft-passage therein, an integral stem-section, a tapered stem-section removably secured on the integral stem-section, a core fitting with the bore of the two-part pipe-stem, said core having a coniform end fitting within the conical seat in the pipe-bowl, and also shaped to provide two separate chambers at the lower side of the core, longitudinal passages and transverse grooves leaving baffle-walls on the upper side of the core, said passages and grooves communicating with the chambers and providing a devious smoke-conduit from the bowl to the tip end of the pipe-stem.

2. A pipe comprising a bowl, having a conical seat adjacent to the draft-passage therein, an integral stem-section thereon having a cylindrical bore, a tapered stem-section having screwed engagement with the integral stem-section, a core-piece fitting into the bore of the two-part stem, said core having a coniform rear end that engages the conical seat in the bowl, a spiral passage in said coniform end merging into a longitudinal passage on the upper side of the core, two chambers on the lower side of the core formed by reductions of its body, baffle-walls on the upper side of the core which is reduced laterally above the chambers to conduct smoke and liquid therein, and an interrupted smoke-passage extended on the core from the chambers to the tip end of the pipe-stem.

In testimony whereof I have signed my name to this specification in the presence of two subscribing witnesses.

EARL DELBERT BUSSERT.

Witnesses:
A. L. FREET,
H. V. BENTLEY.